(12) United States Patent
Kitagawa

(10) Patent No.: US 8,246,085 B2
(45) Date of Patent: Aug. 21, 2012

(54) PIPE COUPLING AND FEMALE PIPE COUPLING MEMBER

(75) Inventor: Hiroyuki Kitagawa, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 341 days.

(21) Appl. No.: 12/679,994

(22) PCT Filed: Sep. 26, 2008

(86) PCT No.: PCT/JP2008/067515
§ 371 (c)(1),
(2), (4) Date: Mar. 25, 2010

(87) PCT Pub. No.: WO2009/041630
PCT Pub. Date: Apr. 2, 2009

(65) Prior Publication Data
US 2010/0201123 A1    Aug. 12, 2010

(30) Foreign Application Priority Data

Sep. 27, 2007    (JP) .................................. 2007-251590

(51) Int. Cl.
*F16L 37/18*    (2006.01)
(52) U.S. Cl. ..................... 285/316; 285/277; 137/614.04
(58) Field of Classification Search .................. 285/276, 285/277, 316, 317; 137/614.02, 614.03, 137/614.04, 614
See application file for complete search history.

(56) References Cited

U.S. PATENT DOCUMENTS
2,674,469 A * 4/1954 Covington et al. ........... 285/277

FOREIGN PATENT DOCUMENTS
| JP | 57-169888 | 10/1982 |
| JP | 2001-254886 | 9/2001 |
| JP | 2003-14186 | 1/2003 |

OTHER PUBLICATIONS

International Search Report issued Oct. 21, 2008 in corresponding International Application No. PCT/JP2008/067515.

* cited by examiner

*Primary Examiner* — David E Bochna
(74) *Attorney, Agent, or Firm* — Wenderoth, Lind & Ponack, L.L.P.

(57) ABSTRACT

A pipe coupling including a female pipe coupling member (3) and a male pipe coupling member (5). The female pipe coupling member (3) includes a female member body (11), a locking element hole (13), a locking element (15), and an outer cylindrical member (17) for preventing the locking element from being dislodged from the locking element hole (13). The male pipe coupling member (5) includes a male member body (21), a displacement preventing portion (23), an engaging groove (25), and a sleeve (27). A sleeve receiving portion (19) is formed between an outer peripheral surface (12) of the female member body (11) and the outer cylindrical member (17). The sleeve receiving portion (19) has a jam preventing portion (20) on the radially outer side of an opening edge (13*b*) of the locking element hole opening at the outer peripheral surface (12) of the female member body (11), whereby the locking element pushed by the sleeve (27) is prevented from being jammed between the opening edge (13*b*) and the sleeve.

19 Claims, 8 Drawing Sheets

PIPE COUPLING AND FEMALE PIPE COUPLING MEMBER

TECHNICAL FIELD

The present invention relates to a pipe coupling and a female pipe coupling member suitable for use with a high-pressure fluid.

BACKGROUND ART

Japanese Unexamined Patent Application Publication No. 2001-254886 discloses a pipe coupling including a female pipe coupling member and a male pipe coupling member. The female pipe coupling member includes a generally cylindrical female member body, a locking element hole formed so as to extend through the female member body in the radial direction of the female member body, a locking element displaceable in the locking element hole, and an outer cylindrical member that forms an annular sleeve receiving portion between an outer peripheral surface of the female member body and the outer cylindrical member and prevents the locking element from being dislodged from the locking element hole. The male pipe coupling member includes a generally cylindrical male member body configured to be inserted into the female member body, and a sleeve provided around the outer periphery of the male member body so as to be slidable and urged forward by means of a spring. When the male member body is inserted into the female member body to a position where an engaging groove formed on an outer peripheral surface of the male member body aligns with the above-described locking element in the radial direction of the male member body, the sleeve is moved forward by a spring urging force while displacing the locking element radially inward to fit the locking element into the engaging groove. The sleeve is then displaced to a position radially outward of the locking element to lock the locking element in the engaging groove. Thus, the female pipe coupling member and the male pipe coupling member are coupled to each other.

DISCLOSURE OF THE INVENTION

Problems to be Solved by the Invention

In use of the above-described pipe coupling for a high-pressure fluid, it is desirable that the above-described sleeve for urging the locking element be thickened in the radial direction thereof as much as possible in order to securely hold the locking element in the engaging groove. As can be seen from the above description, however, the sleeve should be able to be inserted into the sleeve receiving portion between the outer cylindrical member and the outer peripheral surface of the female member body. Therefore, in order to thicken the sleeve, it is necessary to reduce the wall thickness of the female member body. The reduction in the wall thickness of the female member body, however, causes the locking element to considerably project radially outward from the locking element hole by the amount of the reduction. Consequently, when the locking element is pushed by the sleeve into the engaging groove, the locking element may be jammed between the sleeve and an opening edge of the locking element hole, which prevents the locking element from being fitted into the engaging groove. As a result, the male pipe coupling member and the female pipe coupling member may not be coupled properly.

It is an object of the present invention to provide a pipe coupling and a female pipe coupling member in which poor coupling between the male pipe coupling member and the female pipe coupling member can be prevented even if the wall thickness of the sleeve is increased.

Means for Solving the Problems

The present invention therefore provides a pipe coupling including a female pipe coupling member and a male pipe coupling member. The female pipe coupling member includes a cylindrical female member body, and an outer cylindrical member attached to the female member body and forming an annular sleeve receiving portion between an outer peripheral surface of the female member body and the outer cylindrical member. The female pipe coupling member further includes a locking element hole formed so as to extend through the female member body in the radial direction of the female member body and define an opening edge on the outer peripheral surface of the female member body. Further, the female pipe coupling member includes a locking element configured to be displaceable in the radial direction in the locking element hole. The locking element is displaceable between an inner position, where a part of the locking element projects inward from an inner peripheral surface of the female member body, and an outer position, where the locking element engages with an inner peripheral surface of the outer cylindrical member to be prevented from being dislodged from the locking element hole. The male pipe coupling member includes a cylindrical male member body configured to be inserted into the female member body. The male member body has an outer peripheral surface. The outer peripheral surface of the male member body includes a displacement preventing portion that prevents the locking element from displacing to the inner position when the male member body is inserted into the female member body, and a locking element engaging groove formed continuously with and rearward of the displacement preventing portion. When the male member body is inserted into the female member body to a position where the engaging groove aligns with the locking element in the radial direction of the male member body, the locking element is displaced radially inward to be received in the engaging groove. The male pipe coupling member further includes a sleeve provided around the outer peripheral surface of the male member body so as to be slidable in the axial direction of the male member body. The sleeve is urged forward of the male member body by means of a spring. When the male member body is inserted into the female member body, the sleeve is inserted into the sleeve receiving portion and engages with the locking element, which is prevented from displacing to the inner position by means of the displacement preventing portion, thereby being prevented from displacing in the insertion direction of the sleeve. When the locking element engaging groove is aligned with the locking element in the radial direction, the sleeve is displaced forward by an urging force of the spring, thereby displacing the locking element to the inner position so that the locking element is fitted in the locking element engaging groove. Then, the sleeve is placed radially outward of the locking element, thereby locking the locking element in the locking element engaging groove. The female pipe coupling member further includes, on the outer peripheral surface of the female member body, a jam preventing member provided rearward of the opening edge relative to the female member body. When the sleeve engages with the locking element, which is in the outer position, the jam preventing member engages with the locking element, thereby preventing the locking element from being jammed between the sleeve and a rear portion of the opening edge.

In this pipe coupling, as described above, a jam preventing member is provided on the outer peripheral surface of the female member body on the rear side of the opening edge (defined on the outer peripheral surface) of the locking element. Thus, it is possible to prevent the problem caused in the above-described conventional technique.

The present invention also provides a female pipe coupling member configured to be coupled to a male pipe coupling member. The female pipe coupling member includes a female member body configured to receive a cylindrical male member body of the male pipe coupling member from the front end thereof. The female pipe coupling member further includes an outer cylindrical member attached to the female member body and forming an annular sleeve receiving portion between an outer peripheral surface of the female member body and the outer cylindrical member. When the male member body is inserted into the female member body, the outer cylindrical member receives, in the sleeve receiving portion, a sleeve provided around an outer peripheral surface of the male member body so as to be slidable and urged forward of the male member body by means of a spring. Further, the female pipe coupling member includes a locking element hole formed so as to extend through the female member body in the radial direction of the female member body and define an opening edge on the outer peripheral surface of the female member body. The female pipe coupling member further includes a locking element configured to be displaceable in the radial direction in the locking element hole. The locking element is displaceable between an inner position, where a part of the locking element projects inward from an inner peripheral surface of the female member body in which the locking element hole is formed, and an outer position, where the locking element engages with an inner peripheral surface of the outer cylindrical member to be prevented from being dislodged from the locking element hole. When the male member body is inserted into the female member body, the locking element is engaged with the outer peripheral surface of the male member body to be prevented from displacing to the inner position. When the male member body is further inserted into the female member body to a position where a locking element engaging groove formed on the outer peripheral surface of the male member body aligns with the locking element in the radial direction of the male member body, the locking element is displaced to the inner position by means of the sleeve urged by the spring to be fitted into the engaging groove. Then, the locking element is locked in the locking element engaging groove by means of the sleeve placed radially outward of the locking element. Further, the female pipe coupling member includes, on the outer peripheral surface of the female member body, a jam preventing member provided rearward of the opening edge relative to the female member body. When the sleeve engages with the locking element, which is in the outer position, the jam preventing member engages with the locking element, thereby preventing the locking element from being jammed between the sleeve and a rear portion of the opening edge.

In this female pipe coupling member, the above-described jam preventing member is provided, as is the case with the above-described pipe coupling. Thus, it is possible to prevent the problem caused in the above-described conventional female pipe coupling member.

Specifically, in the above-described pipe coupling and the female pipe coupling member, the above-described jam preventing member may have a jam preventing surface. The jam preventing surface extends radially outward and continuously from a rear wall surface of the locking element hole. When the sleeve engages with the locking element, which is in the outer position, the jam preventing surface engages with the locking element to prevent the locking element from being jammed between the sleeve and the opening edge.

More specifically, the jam preventing member may have an annular surface inclined radially outward and rearward and facing the sleeve receiving portion, and the jam preventing surface may be formed on the annular surface.

The locking element may be spherical. When the locking element is in the outer position, the center thereof may be placed radially outward of the outer peripheral surface, on which the opening edge of the locking element hole is formed, of the female member body.

Further, the rear wall surface of the locking element hole and the jam preventing surface continuous with the rear wall surface may form an inclined surface extending radially outward and rearward relative to the female member body.

Furthermore, the front end surface of the sleeve may be an inclined surface extending radially inward and rearward of the sleeve.

BEST MODE FOR CARRYING OUT THE INVENTION

Figure 1:
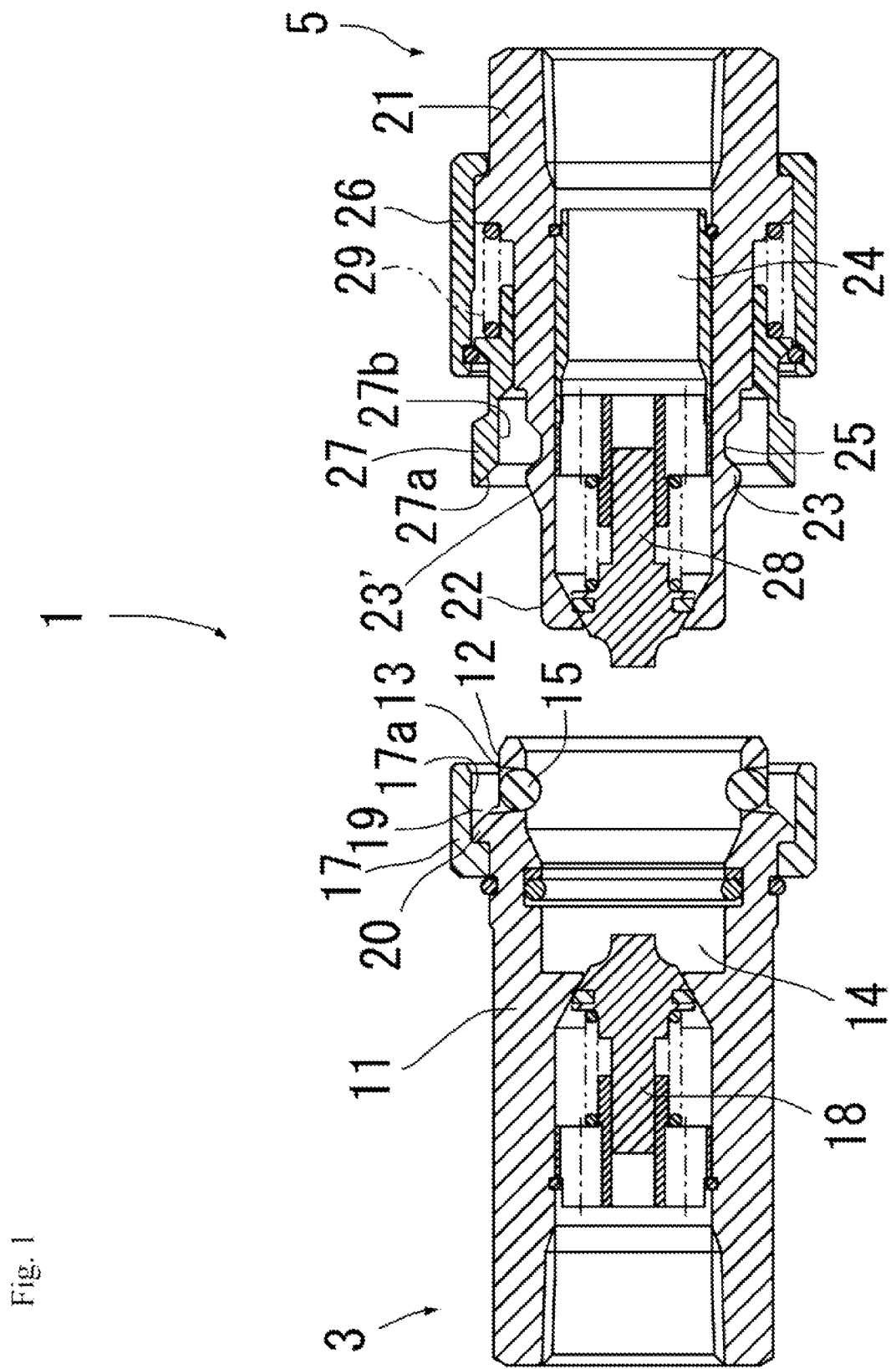
FIG. 1 shows is a longitudinal sectional view of a pipe coupling according to the present invention, showing a state in which a female pipe coupling member and a male pipe coupling member are not connected to each other.

Embodiments of a pipe coupling according to the present invention will now be described with reference to the accompanying drawings.

A pipe coupling 1 according to the present invention includes a female pipe coupling member 3 and a male pipe coupling member 5.

The female pipe coupling member 3 includes a cylindrical female member body 11, an outer cylindrical member 17, locking element holes 13, and locking elements 15. The outer cylindrical member 17 is attached to the female member body and forms an annular sleeve receiving portion 19 between the outer cylindrical member 17 and an outer peripheral surface 12 of the female member body in the vicinity of the forward end of the female member body. The locking element holes 13 are formed in the circumferential direction of the female member body 11 at intervals so as to oppose an inner peripheral surface 17a of the outer cylindrical member 17. The locking element holes 13 extend through the female member body in the radial direction of the female member body. The locking elements 15 are displaceable in the radial direction in the locking element holes, respectively.

Each locking element hole 13 is configured to converge radially inward. Each locking element 15 is displaceable between an inner position (FIG. 1), where the locking element is in a generally radially inner position (FIG. 1) with respect to the outer peripheral surface 12 of the female member body 11 and a part of the locking element projects inward from an inner peripheral surface of the female member body 11, and an outer position (FIG. 6), where the locking element engages with the inner peripheral surface 17a of the outer cylindrical member 17 to be prevented from being dislodged from the locking element hole.

In the illustrated example, a poppet valve 18 is attached to a fluid passage 14 defined inside the female member body 11.

The male pipe coupling member 5 includes a cylindrical male member body 21, a poppet valve 28, a sleeve 27, a coil spring 29, and a retaining cylindrical member 26. The male member body 21 has a forward end 22 configured to be inserted into the female member body 11. The poppet valve 28 is set in a fluid passage 24 of the male member body. The sleeve 27 is provided around an outer peripheral surface of the male member body so as to be slidable in the axial direction. The coil spring 29 is configured to urge the sleeve forward. The retaining cylindrical member 26 is attached to the male member body so as to limit the forward displacement of the sleeve 27.

The forward end 22 of the male member body 21 configured to be inserted into the female member body 11 has an annular displacement preventing portion 23 and a locking element engaging groove 25. When the forward end 22 is inserted into the female member body 11, the displacement preventing portion 23 prevents the locking elements 15 from displacing to the above-described inner position (FIG. 1). The locking element engaging groove 25 is formed continuously with and rearward of the displacement preventing portion. When the male member body 21 is inserted into the female member body 11 to a position where the locking element engaging groove 25 aligns with the locking elements 15 in the radial direction of the male member body, the locking elements 15 are displaced radially inward to be fitted in the locking element engaging groove 25.

When the male member body 21 is inserted into the female member body 11, the sleeve 27 is inserted into the sleeve receiving portion 19. The sleeve 27 then engages with the locking elements (FIG. 4), which are prevented from displacing to the inner position shown in FIG. 1 by means of the displacement preventing portion 23, thereby being temporarily prevented from displacing in the insertion direction of the sleeve 27. Then, when the locking element engaging groove 25 aligns with the locking elements 15 in the radial direction (FIG. 5), the sleeve 27 is displaced forward by an urging force of the coil spring 29. Thus, the sleeve 27 displaces the locking elements 15 to the above-described inner position (FIG. 1) to fit the locking elements 15 into the locking element engaging groove 25. Then, the sleeve 27 is placed radially outward of the locking elements 15, thereby locking the locking elements 15 in the locking element engaging groove 25. A front end surface 27a of the sleeve 27 is configured to be an inclined surface extending radially inward and rearward of the sleeve and apply an urging force to the locking elements 15 in the radially inward direction.

Figure 2:
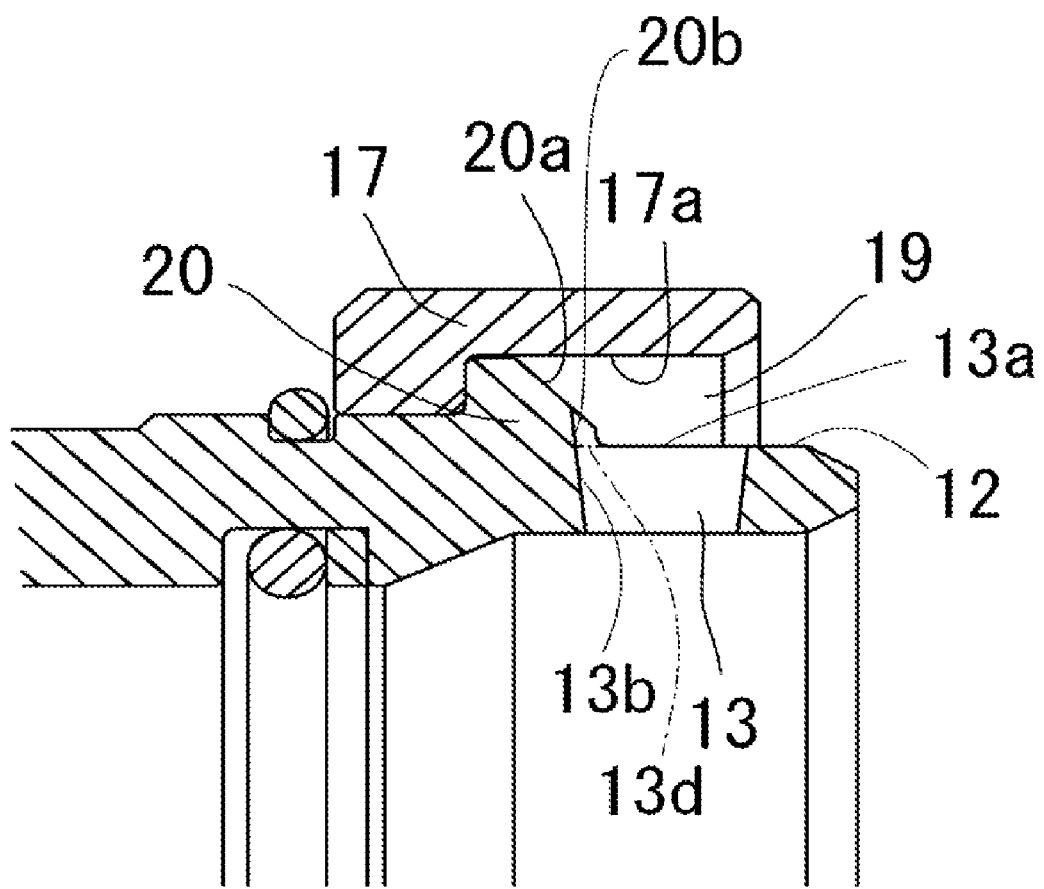
FIG. 2 is an enlarged view of a sleeve receiving portion of the female pipe coupling member in FIG. 1.
Figure 3:
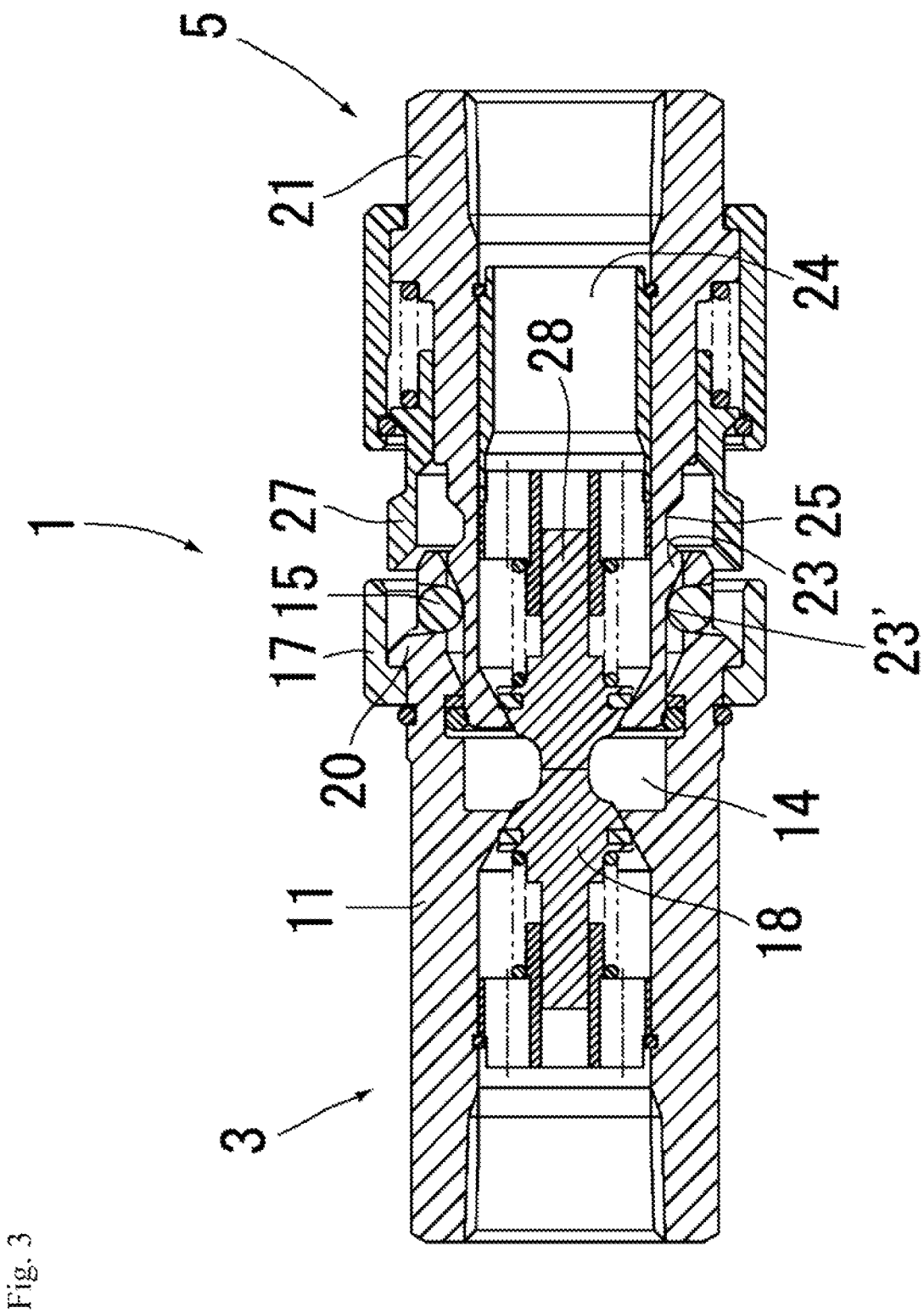
FIG. 3 is a longitudinal sectional view of the pipe coupling in FIG. 1, showing a state in which the male pipe coupling member has been inserted into the female pipe coupling member.
Figure 6:
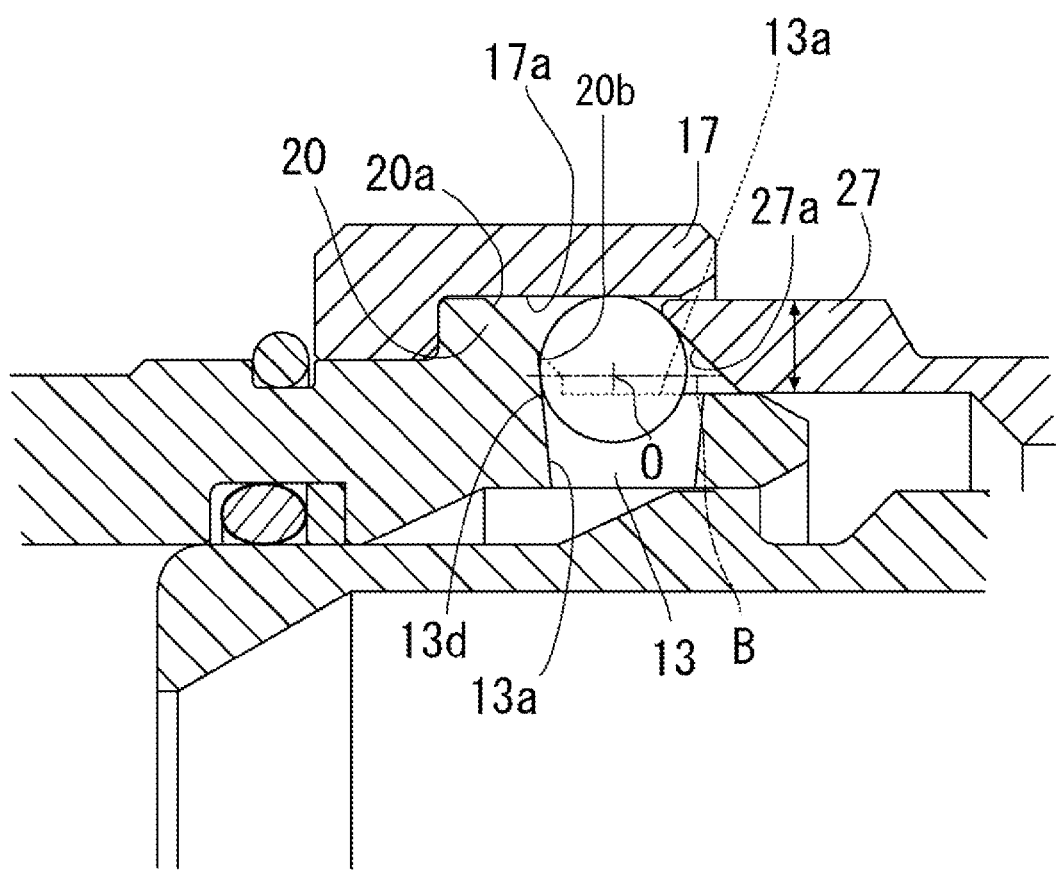
FIG. 6 is an explanatory view of the pipe coupling, showing a locking element in a state in which a sleeve of the male pipe coupling member has been inserted into the sleeve receiving portion of the female pipe coupling member.
Figure 7:
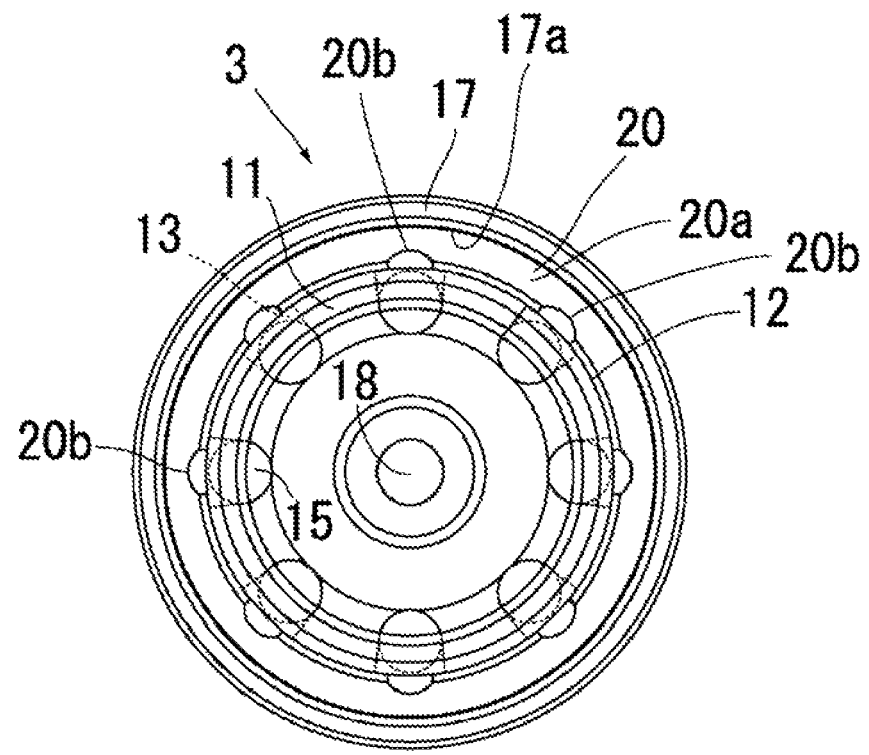
FIG. 7 is an end view of the female pipe coupling member of the pipe coupling.
Figure 8:
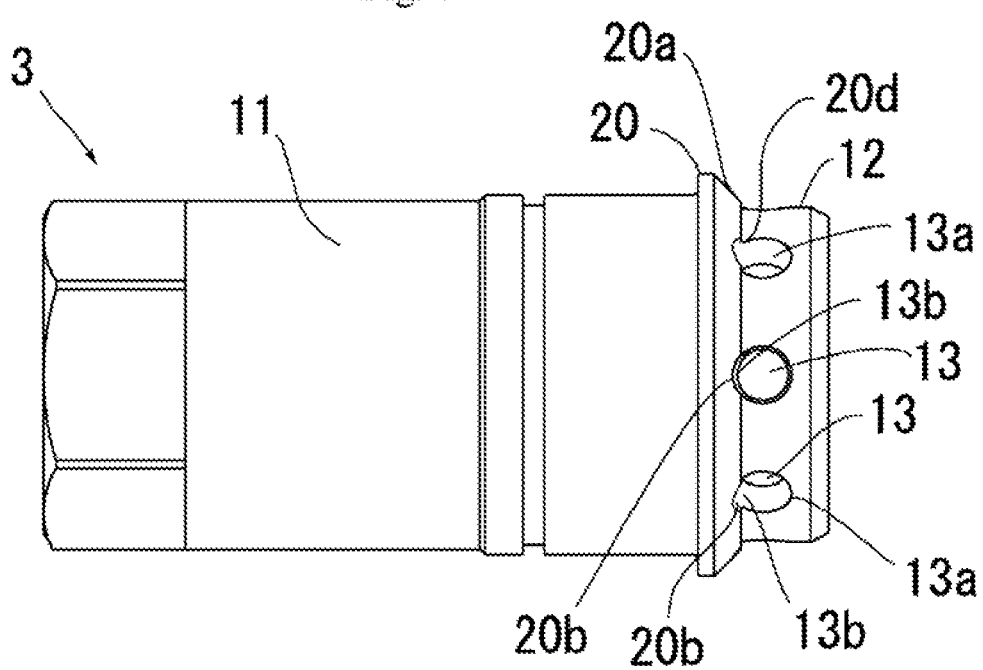
FIG. 8 is a plan view of the female pipe coupling member of the pipe coupling, in which constituent elements other than an outer cylindrical member are shown.

In the pipe coupling according to the present invention, the female pipe coupling member 3 further includes a jam preventing member 20 (FIG. 2). The jam preventing member 20 is situated rearward of opening edges 13a (FIGS. 2 and 8) of the locking element holes 13 and formed on the outer peripheral surface of the female member body 11 in the vicinity of the forward end of the female member body 11. In the illustrated embodiment, this jam preventing member 20 is formed integrally with the female member body 11, and has an annular surface 20a inclined radially outward and rearward and facing the sleeve receiving portion 19. As can be seen in FIGS. 2 and 8, the locking element holes 13 are circular in cross section, and the jam preventing member 20 has jam preventing surfaces 20b that are arc-shaped in cross section and extend radially outward and continuously from rear wall surfaces 13b of the locking element holes 13, respectively. In FIG. 1, the upper and lower locking elements 15, as viewed in the figure, are both in the above-described radially inner position. For example, if the female pipe coupling member shown in FIG. 1 is in a horizontal position and the locking elements 15 are in the vertical positional relationship as shown in the figure, the lower locking element 15 is in the radially outer position by its own weight as shown in FIG. 6. In other words, the lower locking element 15 is in a position where the lower locking element engages with the inner peripheral surface 17a of the outer cylindrical member 17 to be prevented from being dislodged from the locking element hole 13. In this state, the center O of the locking element 15 is placed radially outward of the opening edge 13a of the locking element hole 13. Thus, when the male member body is inserted into the female member body and the sleeve 27 is inserted into the sleeve receiving portion 19, the locking element 15 is urged by means of the sleeve 27 to engage with the jam preventing surface 20b as shown in FIG. 6. In this state, it is possible to avoid the above-described state, i.e., the state in which the locking element is held and jammed between the rear portion 13d of the opening edge 13a of the locking element hole 13 and the sleeve 27 which state occurs in the conventional female pipe coupling member that is not provided with the jam preventing surface 20. Accordingly, the locking element is urged radially inward by further insertion of the sleeve 27 into the sleeve receiving portion 19.

The operation of the above-described pipe coupling will now be described.

When the female pipe coupling member 3 and the male pipe coupling member 5 are not connected to each other, the poppet valve 18 of the female pipe coupling member 3 and the poppet valve 28 of the male pipe coupling member 5 are both closed by spring force, as shown in FIG. 1.

Figure 4:
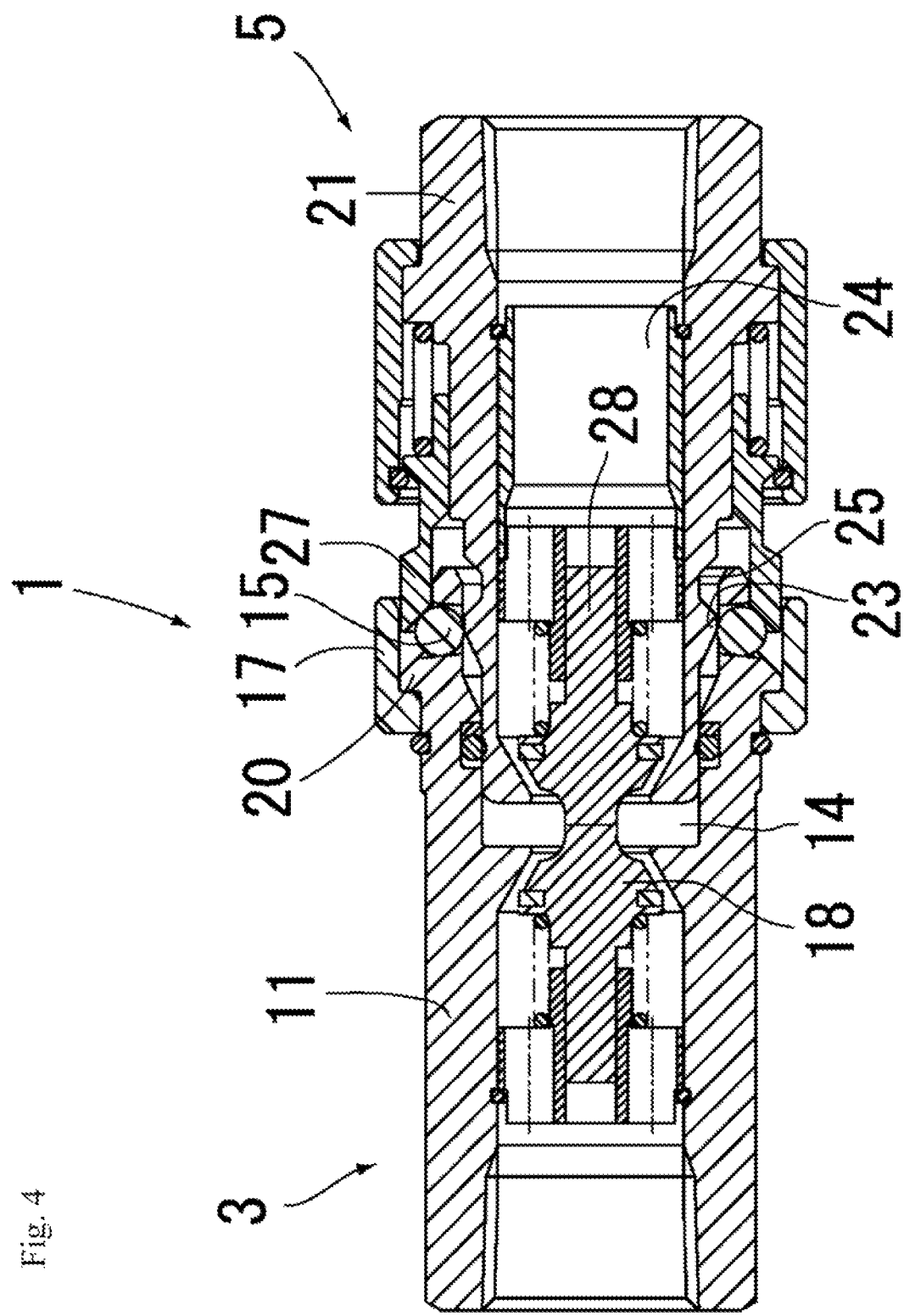
FIG. 4 is a longitudinal sectional view of the pipe coupling, showing a state in which the male pipe coupling member has been further inserted into the female pipe coupling member.
Figure 5:
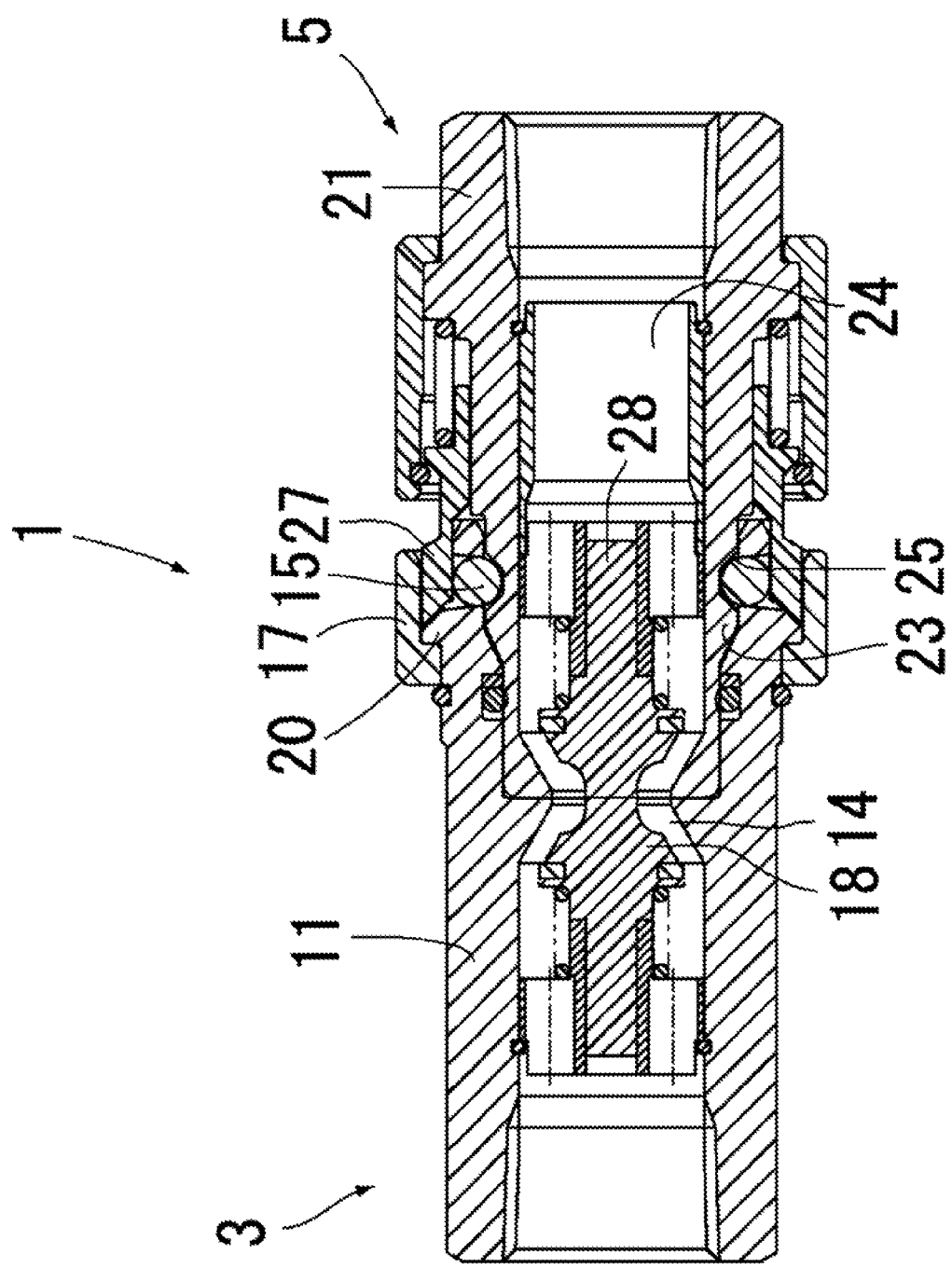
FIG. 5 is a longitudinal sectional view of the pipe coupling, showing a state in which the female pipe coupling member and the male pipe coupling member have been coupled to each other.

When the male pipe coupling member 5 begins to be inserted into the female pipe coupling member 3, the male member body 21 is inserted into the female member body 11 and the sleeve 27 begins to be inserted into the sleeve receiving portion 19. As the insertion of the male pipe coupling member into the female pipe coupling member progresses, the sleeve 27 first engages with the locking elements 15 that are in the state shown in FIG. 6, and then moves forward while engaging the locking elements with the jam preventing surfaces 20b, respectively, whereby the locking elements are displaced radially inward. At the same time, the locking elements 15 that are in the radially inner position shown in FIG. 1 are pushed radially outward by means of a front inclined surface 23' of the jam preventing member 20. Accordingly, all of the locking elements 15 come into engagement with the displacement preventing portion 23 of the male member body 21 as shown in FIG. 4. Thus, the forward movement of the sleeve 27 is temporarily stopped, whereby the coil spring 29 is compressed to accumulate resilient energy in the coil spring. As the insertion of the male pipe coupling member into the female pipe coupling member further progresses, the engaging groove 25 of the male member body comes into alignment with the locking element holes 13 in the radial direction. Then, the locking elements 15 are disengaged from the displacement preventing portion 23, whereby the sleeve 27 is moved forward by means of the coil spring 29 to fit the locking elements into the engaging groove 25 of the male member body. In this state, the inclined front end surface 27a of the sleeve 27 engages with the annular surface 20a of the jam preventing member 20 to stop with the locking elements 15 locked in the engaging groove 25.

Figure 9:
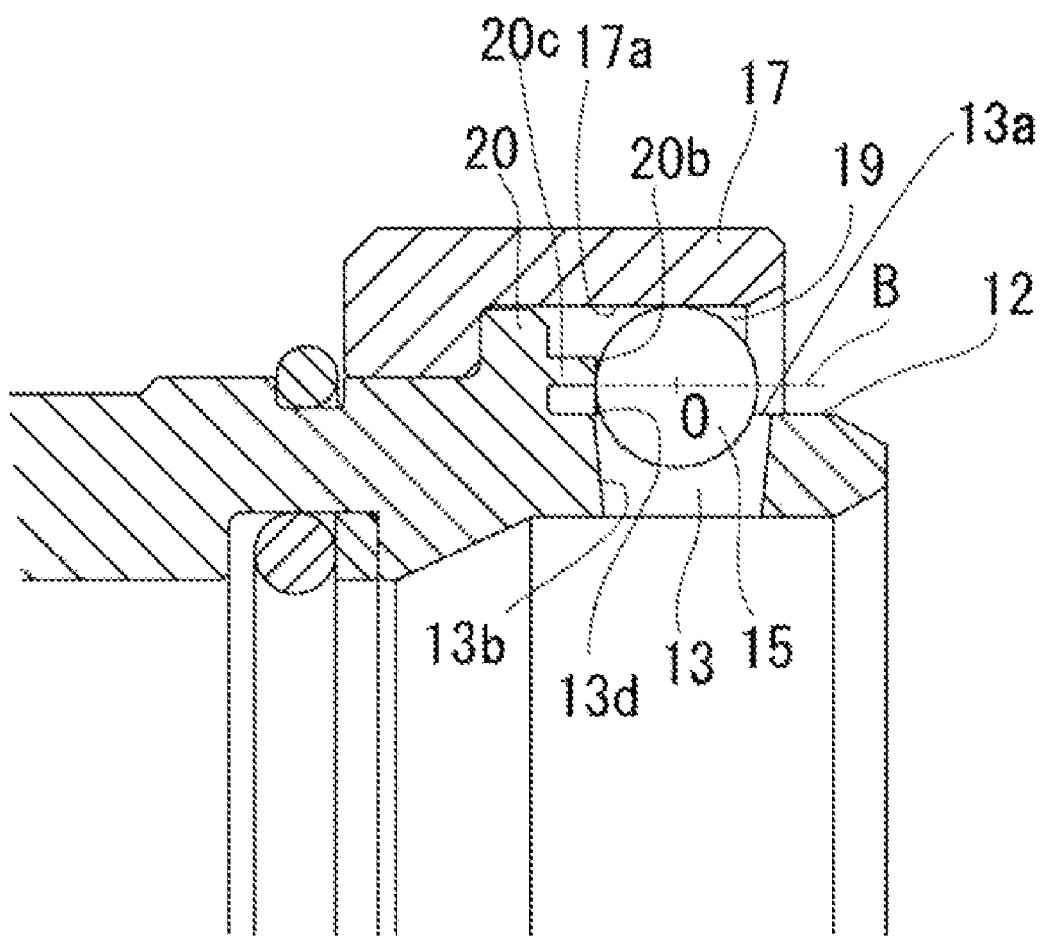
FIG. 9 is an enlarged view of a principal part of a female pipe coupling member according to a second embodiment of the present invention.

FIG. 9 shows a female pipe coupling member according to a second embodiment of the present invention. This female pipe coupling member is arranged as follows. The jam preventing member 20 is provided rearward of the locking element hole 13. The jam preventing member 20 has a projecting portion 20c placed above the opening edge 13a of the locking element hole 13. The projecting portion 20c has, at the forward end thereof, the jam preventing surface 20b.

This jam preventing surface 20b is provided in the vicinity of an axis B that passes through the center O of the locking element 15 when the locking element 15 is in a position where the locking element 15 abuts against the outer cylindrical member 17 (in the illustrated example, the jam preventing surface is provided radially outward of the axis B). In this case, it is preferable that the jam preventing surface 20b projects to the locking element 15 side (the right side in the figure) with respect to a rear portion 13d of the opening edge 13a of the locking element hole 13.

Although some embodiments of the present invention have been described above, the present invention is not necessarily limited to the described embodiments. In the above-described embodiments, the explanation has been made with respect to the case in which the lower locking element in FIG. 1 is prevented from being jammed between the sleeve and the opening edge of the locking element hole. Whereas, locking elements between the upper locking element and the lower locking element, for example, are placed between the position shown in FIG. 6 and the position shown in FIG. 1 when the male pipe coupling member is not inserted into the female pipe coupling member. Therefore, when the sleeve is inserted into the sleeve receiving portion, these locking elements are displaced radially inward by means of the sleeve.

The invention claimed is:

1. A pipe coupling comprising a female pipe coupling member and a male pipe coupling member;
the female pipe coupling member comprising:
a cylindrical female member body;
an outer cylindrical member that is mounted on the female member body and configured to form an annular sleeve receiving portion between an outer peripheral surface of the female member body and an inner peripheral surface of the outer cylindrical member;
a locking element hole formed so as to extend through the female member body in the radial direction of the female member body and define an opening edge on the outer peripheral surface of the female member body; and
a locking element disposed in the locking element hole and displaceable in the radial direction between an inner position where a part of the locking element projects inward from an inner peripheral surface of the female member body and an outer position where the locking element engages with the inner peripheral surface of the outer cylindrical member to be prevented from being dislodged from the locking element hole;
the male pipe coupling member comprising:
a cylindrical male member body configured to be inserted into the female member body, the male member body having an outer peripheral surface that includes a displacement preventing portion configured to prevent the locking element from being displaced to the inner position when the male member body is inserted into the female member body, and a locking element engaging groove adjoining and rearward of the displacement preventing portion so that, when the male member body is inserted into the female member body and comes to a position where the engaging groove aligns with the locking element in the radial direction of the male member body, the locking element is displaced radially inward to be received in the engaging groove; and
a sleeve provided around the outer peripheral surface of the male member body so as to be slidable in the axial direction of the male member body, the sleeve being urged forward of the male member body by means of a spring, wherein when the male member body is inserted into the female member body, the sleeve is inserted into the sleeve receiving portion to engage with the locking element which is prevented from being displaced to the inner position by means of the displacement preventing portion so that the sleeve is prevented from further being inserted into the sleeve receiving portion, and when the locking element engaging groove is aligned with the locking element in the radial direction, the sleeve is advanced forward by an urging force of the spring to displace the locking element to the inner position so that the locking element is fitted in the locking element engaging groove and then the sleeve is placed radially outward of the locking element to lock the locking element in the locking element engaging groove;
the female pipe coupling member further comprising, on the outer peripheral surface of the female member body, a jam preventing member situated rearward of the opening edge relative to the female member body, wherein when the sleeve engages with the locking element which is in the outer position, the jam preventing member prevents the locking element from being jammed between the sleeve and a rear portion of the opening edge by engaging with the locking element.

2. The pipe coupling according to claim 1, wherein the jam preventing member has a jam preventing surface extending radially outward and continuously from a rear wall surface of the locking element hole and, when the sleeve engages with the locking element which is in the outer position, the jam preventing surface engages with the locking element to prevent the locking element from being jammed between the sleeve and the opening edge.

3. The pipe coupling according to claim 2, wherein the jam preventing member has an annular surface inclined radially outward and rearward and facing the sleeve receiving portion, and the jam preventing surface is formed on the annular surface.

4. The pipe coupling according to claim 3, wherein the rear wall surface of the locking element hole and the jam preventing surface continuous with the rear wall surface form an inclined surface extending radially outward and rearward relative to the female member body.

5. The pipe coupling according to claim 3, wherein a front end surface of the sleeve is an inclined surface extending radially inward and rearward of the sleeve.

6. The pipe coupling according to claim 2, wherein the locking element is spherical and, when the locking element is in the outer position, the center thereof is placed radially outward of the outer peripheral surface of the female member body on which the opening edge of the locking element hole is defined.

7. The pipe coupling according to claim 6, wherein the rear wall surface of the locking element hole and the jam preventing surface continuous with the rear wall surface form an inclined surface extending radially outward and rearward relative to the female member body.

8. The pipe coupling according to claim 6, wherein a front end surface of the sleeve is an inclined surface extending radially inward and rearward of the sleeve.

9. The pipe coupling according to claim 2, wherein the rear wall surface of the locking element hole and the jam preventing surface continuous with the rear wall surface form an inclined surface extending radially outward and rearward relative to the female member body.

10. The pipe coupling according to claim 2, wherein a front end surface of the sleeve is an inclined surface extending radially inward and rearward of the sleeve.

11. The pipe coupling according to claim 1, wherein a front end surface of the sleeve is an inclined surface extending radially inward and rearward of the sleeve.

12. A female pipe coupling member configured to be coupled to a male pipe coupling member, comprising:
a female member body configured to receive, from a front end thereof, a cylindrical male member body of the male pipe coupling member;
an outer cylindrical member mounted on the female member body and forming an annular sleeve receiving portion between an outer peripheral surface of the female member body and an inner peripheral surface of the outer cylindrical member, wherein when the male member body is inserted into the female member body, the outer cylindrical member receives, in the sleeve receiving portion, a sleeve provided around an outer peripheral surface of the male member body so as to be slidable and urged forward of the male member body by means of a spring;
a locking element hole formed so as to extend through the female member body in the radial direction of the female member body and define an opening edge on the outer peripheral surface of the female member body; and,
a locking element disposed in the radial direction in the locking element hole and displaceable between an inner position where a part of the locking element projects inward from an inner peripheral surface of the female member body with the locking element hole, and an outer position where the locking element engages with the inner peripheral surface of the outer cylindrical member to be prevented from being dislodged from the locking element hole, wherein when the male member body is inserted into the female member body, the locking element is engaged with the outer peripheral surface of the male member body to be prevented from being displaced to the inner position and, when the male member body is further inserted into the female member body and comes to a position where a locking element engaging groove formed on the outer peripheral surface of the male member body aligns with the locking element in the radial direction of the male member body, the locking element is displaced to the inner position by means of the sleeve urged by the spring to be fitted into the engaging groove, and then the locking element is locked in the locking element engaging groove by means of the sleeve placed radially outward of the locking element;
the female pipe coupling member further comprising, on the outer peripheral surface of the female member body, a jam preventing member situated rearward of the opening edge relative to the female member body, wherein when the sleeve engages with the locking element which is in the outer position, the jam preventing member prevents the locking element from being jammed between the sleeve and a rear portion of the opening edge by engaging with the locking element.

13. The female pipe coupling member according to claim 12, wherein jam preventing member has a jam preventing surface extending radially outward and continuously from a rear wall surface of the locking element hole and, when the sleeve engages with the locking element which is in the outer position, the jam preventing surface engages with the locking element to prevent the locking element from being jammed between the sleeve and the opening edge.

14. The female pipe coupling member according to claim 13, wherein the jam preventing member has an annular surface inclined radially outward and rearward and facing the sleeve receiving portion, and the jam preventing surface is formed on the annular surface.

15. The female pipe coupling member according to claim 14, wherein the annular surface is configured to abut against a front end surface of the sleeve.

16. The female pipe coupling member according to claim 14, wherein the rear wall surface of the locking element hole and the jam preventing surface continuous with the rear wall surface form an inclined surface extending radially outward and rearward relative to the female member body.

17. The female pipe coupling member according to claim 13, wherein the rear wall surface of the locking element hole and the jam preventing surface continuous with the rear wall surface form an inclined surface extending radially outward and rearward relative to the female member body.

18. The female pipe coupling member according to claim 13, wherein the locking element is spherical and, when the locking element is in the outer position, the center thereof is placed radially outward of the outer peripheral surface of the female member body.

19. The female pipe coupling member according to claim 18, wherein the rear wall surface of the locking element hole and the jam preventing surface continuous with the rear wall surface form an inclined surface extending radially outward and rearward relative to the female member body.

* * * * *